US012654473B2

(12) United States Patent
Lorente Tejero et al.

(10) Patent No.: US 12,654,473 B2
(45) Date of Patent: Jun. 16, 2026

(54) MEDIA HOLDERS

(71) Applicant: Hewlett-Packard Development Company, L.P., Spring, TX (US)

(72) Inventors: Victor Lorente Tejero, Sant Cugat del Valles (ES); Ricard Ejarque Montalvo, Sant Cugat del Valles (ES); Albert Estella Aguerri, Sant Cugat del Valles (ES); David Munoz Navarro, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 291 days.

(21) Appl. No.: 18/250,447

(22) PCT Filed: Oct. 26, 2020

(86) PCT No.: PCT/US2020/057331

§ 371 (c)(1),
(2) Date: Apr. 25, 2023

(87) PCT Pub. No.: WO2022/093169

PCT Pub. Date: May 5, 2022

(65) Prior Publication Data

US 2023/0398795 A1 Dec. 14, 2023

(51) Int. Cl.

| | |
|---|---|
| ***B41J 11/00*** | (2006.01) |
| ***B41J 13/10*** | (2006.01) |
| ***B41J 25/308*** | (2006.01) |
| ***B65H 5/36*** | (2006.01) |

(52) U.S. Cl.
CPC .......... *B41J 11/005* (2013.01); *B41J 11/0005* (2013.01); *B41J 11/0085* (2013.01); *B41J 13/10* (2013.01); *B41J 25/308* (2013.01); *B65H 5/36* (2013.01)

(58) Field of Classification Search
CPC ...................................................... B41J 25/308
See application file for complete search history.

(56) References Cited

U.S. PATENT DOCUMENTS

| | | | |
|---|---|---|---|
| 5,664,895 A | 9/1997 | Asai et al. | |
| 6,808,259 B2 | 10/2004 | Rasmussen et al. | |
| 7,156,482 B2 | 1/2007 | Boleda et al. | |
| 8,757,746 B2 | 6/2014 | Wing et al. | |
| 9,028,160 B2 * | 5/2015 | Garcia | B41J 15/04 101/474 |
| 9,073,352 B2 * | 7/2015 | Uchiyama | B41J 11/0085 |
| 9,434,186 B2 | 9/2016 | Gracia Verdugo et al. | |

(Continued)

FOREIGN PATENT DOCUMENTS

| | | |
|---|---|---|
| FR | 2828833 A1 | 2/2003 |
| WO | 2019/022772 A1 | 1/2019 |

*Primary Examiner* — Shelby L Fidler
(74) *Attorney, Agent, or Firm* — Jordan IP Law, LLC

(57) ABSTRACT

An apparatus is disclosed herein. The apparatus comprises a carriage to move laterally in a scanning direction over a platen, a scan beam to support the carriage over the platen, a mechanism to move the scan beam vertically, and a media holder. The media holder comprises a central portion to hold a media on the platen, a first end couplable to the platen at a coupling position, and a second end couplable to the scan beam such that the second end moves vertically along with the scan beam.

11 Claims, 2 Drawing Sheets

(56) References Cited

U.S. PATENT DOCUMENTS

| | | | | |
|---|---|---|---|---|
| 10,137,704 | B2 | 11/2018 | Faundez et al. | |
| 2003/0039502 | A1 | 2/2003 | Plumley et al. | |
| 2003/0081972 | A1 * | 5/2003 | Miranda | B41J 25/308 400/55 |
| 2005/0206706 | A1 | 9/2005 | Perez et al. | |
| 2008/0238978 | A1 | 10/2008 | Niimi | |
| 2009/0289987 | A1 | 11/2009 | Kayanaka | |
| 2013/0135413 | A1 * | 5/2013 | Ito | B41J 11/04 269/296 |
| 2018/0178554 | A1 * | 6/2018 | Washizawa | B41J 11/0015 |
| 2018/0178555 | A1 * | 6/2018 | Van Vliembergen | B41J 11/0085 |
| 2019/0240999 | A1 * | 8/2019 | Vaillancourt | B41J 11/0045 |

* cited by examiner

MEDIA HOLDERS

BACKGROUND

Printers are devices that record images on a printing media. Printers comprise printheads in a carriage that selectively propel an amount of printing fluid on the media. Some printers may include internal printing fluid reservoirs. Other printers may use external printing fluid cartridges as printing fluid reservoirs.

BRIEF DESCRIPTION OF THE DRAWINGS

The present application may be more fully appreciated in connection with the following detailed description of non-limiting examples taken in conjunction with the accompanying drawings, in which like reference characters refer to like parts throughout and in which.

DETAILED DESCRIPTION

Figure 1A:
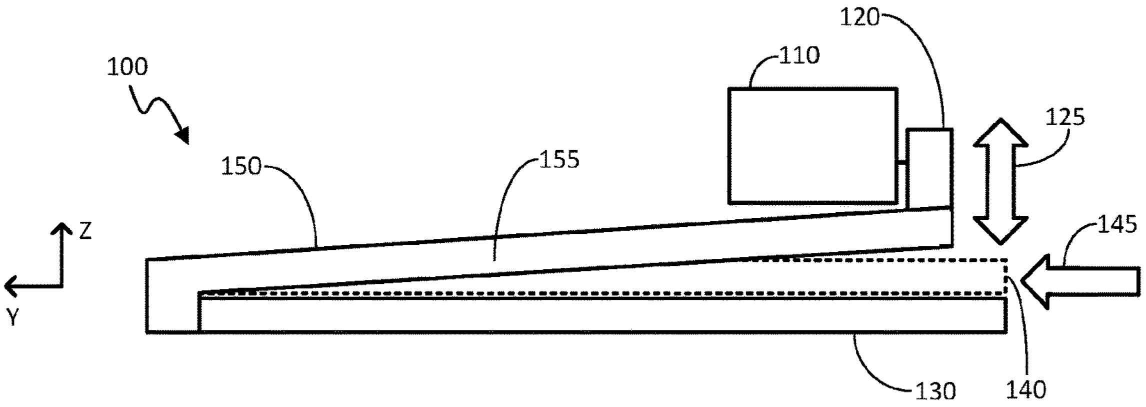
FIG. 1A is a schematic diagram showing an example of a side view of an apparatus with a media holder.

The following description is directed to various examples of printing systems. Throughout the present disclosure, the terms “a” and “an” are intended to denote at least one of a particular element. In addition, as used herein, the term “includes” means includes but not limited to, the term “including” means including but not limited to. The term “based on” means based at least in part on.

As used herein, the terms “about” and “substantially” are used to provide flexibility to a range endpoint by providing that a given value may be, for example, an additional 15% more or an additional 15% less than the endpoints of the range. In another example, the range endpoint may be an additional 30% more or an additional 30% less than the endpoints of the range. The degree of flexibility of this term can be dictated by the particular variable and would be within the knowledge of those skilled in the art to determine based on experience and the associated description herein.

For simplicity, it is to be understood that in the present disclosure, elements with the same reference numerals in different figures may be structurally the same and may perform the same functionality.

Printers comprise a carriage having elements to selectively propel an amount of printing fluid on a media. In some printers, the carriage is a fixed carriage spanning at least the full width of the printable area of the media, so that as the media travels underneath, the elements from the carriage propel the printing fluid and thereby generate the image to be recorded. In other examples, however, the carriage is a moveable carriage that does not span the full width of the printable area of the media. The scanning carriage is therefore controllable to scan across the full width of the printable area of the media (i.e., scanning direction) and to selectively propel the printing fluid on the media.

Some printers may accommodate a plurality of printing media of different thicknesses and rigidity values, for example, from less than about 1 cm to about 6 cm. Some printing media may include paper, textile, vinyl, wood, methacrylate, other plastics, ceramic, foam, metal or composites.

Due to the printing fluid deposition, watering and curing operations may be taken place at the print zone of the printer, which may be subject to substantially hot and humid conditions. Such heat and humidity tend to warp the edges of some types of media at the print zone of a printer and thereby cause print quality effects.

In order to prevent warping of the edges of the media, some printers include edge holders located at the platen of the print zone to hold the edges of the media to the platen and therefore inhibit the media edge warpage. However, these edge holders have a predetermined thickness and are custom made to a specific media thickness, thereby not being suitable to accommodate media of different thicknesses.

In the examples herein, the terms “width” and “length” have been used. The two terms are intended to denote two substantially orthogonal directions within a horizontal plane. In further examples, the terms width and length may be used interchangeably. Furthermore, the terms “laterally” and “vertically” have been used. These terms are intended to further denote two substantially orthogonal directions, where laterally is a direction within the horizontal plane and vertically is the orthogonal direction from the horizontal plane (e.g., normal vector).

Figure 1B:
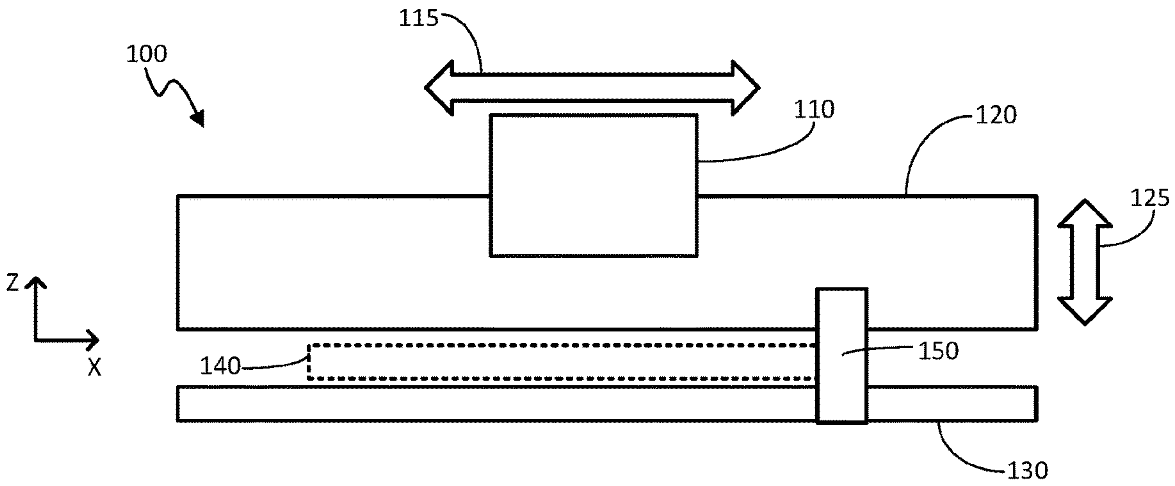
FIG. 1B is a schematic diagram showing an example of a front view of an apparatus with a media holder.

Referring now to the drawings, FIG. 1A-1B are schematic diagrams showing an example of a side view and front view respectively of an apparatus 100. The apparatus 100 includes a media holder 150. In some examples, the apparatus 100 is a printing apparatus, such as a printer.

The apparatus 100 comprises a platen 130 to hold a media 140. The media 140 is to move bidirectionally along the length of the platen 130, for example, in a media path direction 145. In the examples herein, the media 140 has been illustrated in dotted lines for clarity purposes, as it is an external element from the apparatus 100 that interacts with the apparatus 100 (e.g., the media may not be present during transportation of the apparatus 100). In some examples, the width of the media 140 covers substantially the full printable area on the platen 130. In other examples, however, the width of the media 140 cover a portion of the printable area on the platen 130. In yet other examples, the platen 130 is to hold a plurality of media 140, the width of the combined plurality of media 140 covering, at most, substantially the entire printable area on the platen 130.

In some examples, the platen 130 is a static platen 130. In other examples, parts of the platen 130 may be moveable, for example horizontally or vertically. Additionally, in further examples, the platen may be a porous platen fluidically connectable to a vacuum source (not shown) such that, when in use, the vacuum source is controlled to cause vacuum conditions to the at least the print area of the platen. In some examples, the porous platen may be implemented as a solid platen made out of a porous material with air pockets to enable air to traverse therethough. In other examples, however, the platen may include a set of perforations or pores of a predefined size or set of predefined sizes distributed across the surface of the platen in fluid communication to the vacuum source, the pores or perforations to enable air to traverse therethrough. The vacuum conditions provide a suction force to the media 140 such that substantially the entire lower surface of the media 140 sticks to the upper surface of the platen 130, thereby substantially inhibiting a vertical movement of the media 140.

The apparatus 100 comprises a carriage 110 including a set of printheads in fluid communication with a set of printing fluids from a supply or cartridge. Some examples of printheads may include thermal inkjet printheads, piezoelectrical printheads, or any suitable type of printhead. In some examples, the printheads are removable printheads. In other examples, the printheads are an integral part of the carriage. The supply is an external element from the apparatus 100. In some examples, the supply is to be hosted in the carriage, for example in a designated slot within the carriage. In other examples, the supply is to be hosted away from the carriage with fluid pathways that fluidically connect the supply with carriage and/or the printheads within the carriage.

The carriage 110 is controllable to move laterally along the scanning direction 115 and over the platen 130. When in use, the carriage 110 is further controllable such that the printheads selectively eject amount of the set of printing fluids on the media 140 based on previously received print job data. The print job data may be a digital product including the images and/or text to be recorded on the media. The print job data may be received in a plurality of digital formats, such as JPEG, TIFF, PNG, PDF and the like.

In some examples, the printheads may eject a plurality of printing fluids. A printing fluid may be a solution of pigments dispersed in a liquid carrier such as water or oil. Some recording printing fluids may include Black ink, White ink, Cyan ink, Yellow ink, Magenta ink, Red ink, Green ink, and/or Blue ink. Other non-recording printing fluids may be used to provide additional properties to the printing fluids ejected on the media 140, for example, resistance to light, heat, scratches, and the like.

The apparatus 100 further comprises a scan beam 120 to support the carriage 110 over the platen 130 as the carriage 110 moves laterally along the scanning direction 115. Therefore, the carriage 110, and thereby the printheads, are substantially at the same height with respect to the upper surface of the media 140 along the different positions of a single swath and among the different swaths that constitute the print job.

The apparatus 100 is a printing apparatus suitable to record images in a plurality of media 140 of different thicknesses. As such, the apparatus 100 further comprises a mechanism (not shown) to move the scan beam 120 vertically to accommodate to the thickness of the media 140 to be used (e.g., arrow 125). Therefore, the scan beam 120 is to move vertically based on the type of media 140 to be used. In some examples, the mechanism may place the bottom surface of the printheads (i.e., the printhead nozzles) or the bottom surface of the carriage 110 at a distance based on the thickness of the media 140 and the pen-to-media distance. The pen-to-media distance is an encoded value indicative of the recommended distance in which the nozzles of the printhead need to be located above the upper surface of the media 140 to achieve a predetermined print quality level and thereby avoid print quality defects.

The speed, position and movement of the carriage 110, the printheads, and the mechanism may be controlled by a set of electronic components, such as a processor, a CPU, a SoC, a FPGA, a PCB and/or a controller. In the examples herein, a controller may be understood as any combination of hardware and programming that may be implemented in a number of different ways. For example, the programming of modules may be processor-executable instructions stored in at least one non-transitory machine-readable storage medium and the hardware for modules may include at least one processor to execute those instructions. In some examples described herein, multiple modules may be collectively implemented by a combination of hardware and programming. In other examples, the functionalities of the controller may be, at least partially, implemented in the form of an electronic circuitry. A controller may be further understood as a distributed controller, a plurality of controllers, and the like.

The apparatus 100 further comprises a media holder 150 to hold an edge of the media 140 to the platen 130 and therefore inhibit an edge of the media 140 to warp or bend upwards. The media holder 150 comprises a central portion 155, a first end portion, and a second end portion. The first end portion is located at the opposite end than the second end portion with respect to the central portion 155 of the media holder 150.

The central portion 155 is to hold the edge of the media 140 to the platen 130. In some examples, the central portion 155 is an elongated portion that spans substantially the length of the printable area on the platen 130. The central portion 155 of the media holder 150 is to hold down the edge of the media 140 such that the edge of the media 140 does not warp with respect to the platen 130, i.e., moves away from the platen. The central portion 155 may be made of a suitable material that withstands the force generated by the media 140 as the edge of the media 140 bends upwardly.

The first end of the media holder 150 is couplable to the platen 130 at a coupling position. In some examples, the first end of the media holder 150 is attached to the to the platen 130, for example, bolted or screwed. In other examples, however, the first end of the media holder 150 is removable and attachable to the platen 130, for example, through a grip or clamp mechanism. As such, the first end of the media holder 150 may be removably couplable with the coupling position from the platen 130. In some examples, the coupling position is out of the print zone of the apparatus 100. In other examples, the coupling position is at the edge of the platen 130.

In an additional example in which the first end of the media holder 150 is attached to the platen 130, the apparatus 100 may further comprise a guiding system at the coupling position to enable the coupling position (and the media holder) to move in the scanning direction. In other examples, the first end of the media holder 150 may be attached to the platen 130 such that the media holder 150 is not moveable along the scanning axis.

The second end of the media holder 150 is couplable to the scan beam 120. Coupling the second end of the media holder 150 to the scan beam 120, enables the second end of the media holder 150 to move vertically along with the scan beam. As such, the media holder 150 is adaptable to a height variation of the scan beam 120 caused by a variation of the media thickness and/or the pen-to-media distance.

In some examples, the second end of the media holder 150 is attached to the to the scan beam 120, for example, bolted or screwed. In other examples, however, the second end of the media holder 150 is removable and attachable to the scan beam 120, for example, through a grip or clamp mechanism. As such, the second end of the media holder 150 may be removably couplable with the scan beam 120. Additionally, the second end of the media holder 150 is attached to a guiding system of the scan beam 120 such that the coupling position and the media holder are enabled to move in the scanning direction.

Figure 2:
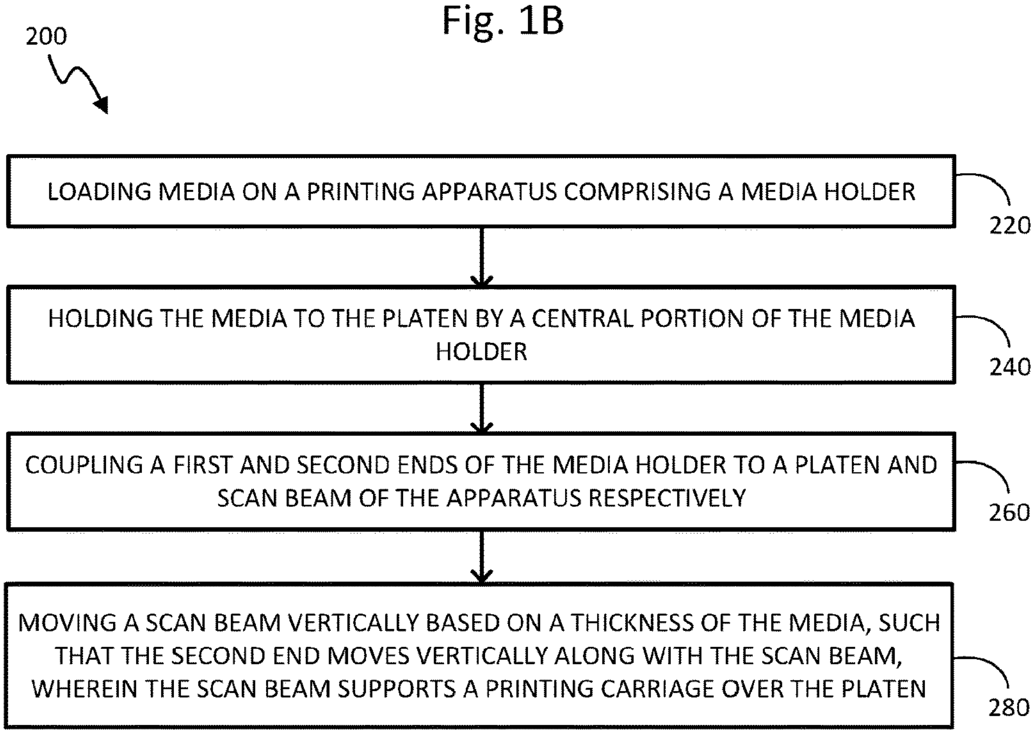
FIG. 2 is a flowchart of an example method for using a media holder in a printer.

FIG. 2 is a flowchart of an example method 200 for using a media holder 150 in a printer, for example the apparatus 100 of FIG. 1. The method 200 may involve previously disclosed elements from FIG. 1 referred to with the same reference numerals. In some examples, parts of the method 100 may be executed by a controller.

At block 220, a media 140 is loaded on the printing apparatus 100 comprising the media holder 150. In some examples, the controller receives data of the media 140 which includes the thickness of the media 140. Additionally, the data may include further information of the media 140, for example, the type of media, the print mode to be used on such media, and the like. In some examples, the data includes the distance in which the printhead from the carriage 110 and the upper surface of the media 140 may be spaced apart during the printing operation such that the expected print quality output is achieved (i.e., pen-to-media distance).

At block 240, the media holder 150 holds a first edge of the media 140 on the platen 130 by a longitudinal side of the media holder 150 corresponding to the central portion 155 of the media holder 150.

At block 260, the first end of the media holder 150 is coupled to the coupling position of the platen 130 and a second end of the media holder 150 is coupled to the scan beam 120. Accordingly, the media holder 150 may hold the first edge of the media 140 as the scan beam 120 moves vertically.

At block 280, the controller moves the scan beam 120 vertically based on the received data. In some examples, the controller may control the mechanism to move the scan beam 120 vertically based on the thickness of the media 140. Additionally, the controller may further control the mechanism to move the scan beam 120 vertically based on the pen-to-media distance. As mentioned above, the carriage 110 moves vertically with the scan beam 120, as the scan beam 120 supports the carriage 110 over the platen 130.

Additionally, the controller may control the carriage 110 to move laterally along the scanning direction and the printheads to selectively eject the printing fluid on the media, based on the position of the carriage 110, to print a previously received print job encoded as print job data. The print job data may include images and/or text to be recorded on the media 140.

Figure 3:
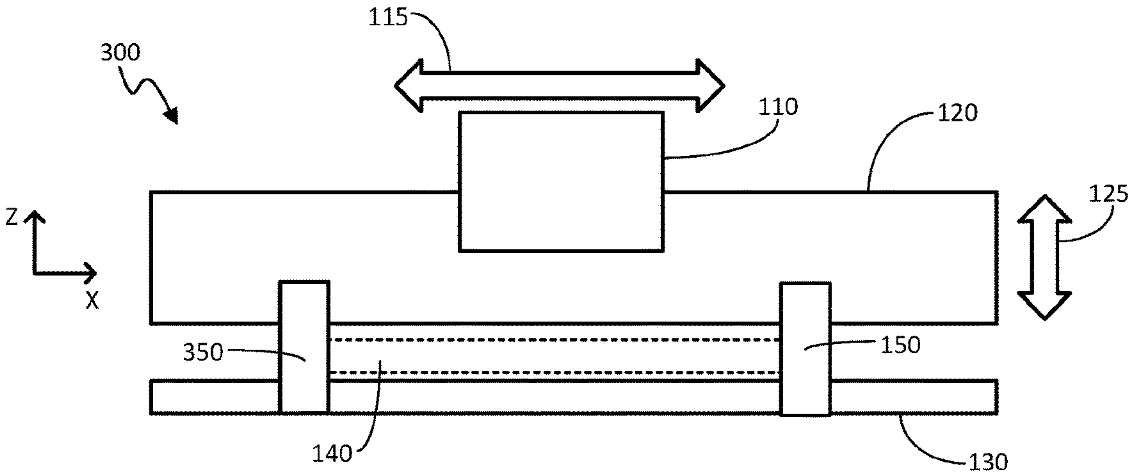
FIG. 3 is a schematic diagram of another example of an apparatus with a plurality of media holders.

In some examples, the apparatus may comprise a plurality of media holders 150 (see, FIG. 3). In these examples, method 200 may be executed for at least a subset of the plurality of media holders 150.

FIG. 3 is a schematic diagram of another example of an apparatus 300 with a plurality of media holders, for example as the media holder 150 from FIG. 1. The printing system may involve previously disclosed elements from FIG. 1 referred to with the same reference numerals. The apparatus 300 includes the carriage 110, the scan beam 120 and the platen 130. A media 140 may be placed on the platen 130.

In some examples, the media 140 to be recorded on may tend to warp in both edges. In theses examples, the apparatus 300 may comprise a first media holder 150 to hold the first edge of the media 140 on the platen 130, and a second additional media holder 350 to hold a second opposite edge of the media 140 on the platen 130. As such, each media holder holds its corresponding edge of the media 140 to inhibit any vertical bending or warpage. Each media holder may hold its corresponding edge of the media 140 in a similar manner as the media holder 150 from FIG. 1.

In other examples, a plurality of media may be recorded at the same time on the platen 130. In these examples, the apparatus may comprise a media holder for each edge of each media 140 that is being recorded on the platen 130. Each media holder may hold its corresponding edge of the media 140 in a similar manner as the media holder 150 from FIG. 1.

Figure 4A:
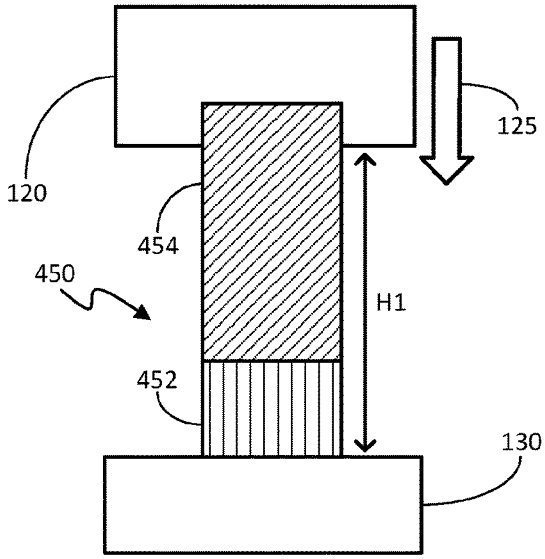
FIG. 4A is a schematic diagram of an example of a media holder once a scan beam is in a first position.
Figure 4B:
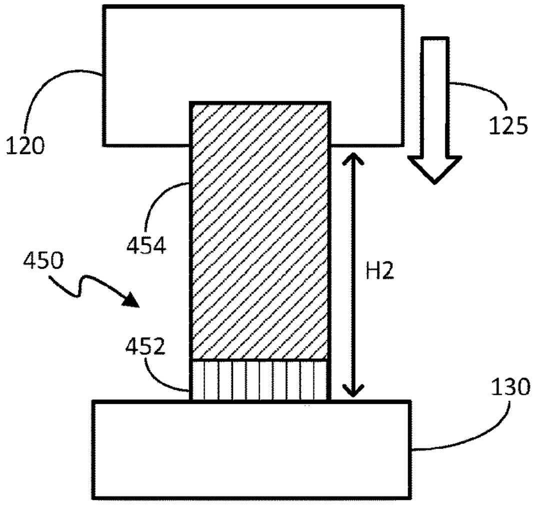
FIG. 4B is a schematic diagram of an example of a media holder once a scan beam is in a second position.

FIGS. 4A-B are schematic diagrams of front views of an example of a media holder 450 once a scan beam 120 is in a first position (i.e., FIG. 4A) and in a second position (i.e., FIG. 4B). The media holder 450 may interact with previously disclosed elements from FIG. 1 referred to with the same reference numerals. Parts of the media holder 450 may be similar to the corresponding parts of the media holder 150 of FIG. 1. Accordingly, the media holder 450 comprises a central portion 155, a first end coupled to the platen 130, and a second end coupled to the scan beam 120.

In an example, the central portion 155 of the media holder 450 may be made of an elastic and/or compressible material, such that the central portion 155 changes its length as the mechanism moves the scan beam 120 vertically downwardly (e.g., shortens) and upwardly (e.g., lengthens). As such, the media holder 450 adapts to the different heights of the scan beam 120 as well as maintaining contact and thereby hold down the upper surface of the media 140 on the platen 130.

In another example, the central portion 155 of the media holder 450 comprises a first elastic part 452 and a second non-elastic part 454. In some examples, the second non-elastic part 454 is longer than the first elastic part 452. The first elastic part 452 is to compress as the mechanism moves the scan beam 120 vertically downwardly. As shown in the illustrated example, the configuration of FIG. 4A shows the scan beam 120 at a first position in which the scan beam 120 is at a higher height (i.e., H1) and the configuration of FIG. 4B shows that the scan beam 120 has moved to at a second position in which the scan beam 120 is at a lower height (i.e., H2). As shown, the movement of the scan beam 120 has compressed the first compressible element 452 and has not compressed the second non-compressible element 454. As such, the non-compressible element 454 has been in contact with the edge of the media 140 to avoid media warpage and the compressible element 452 compresses, such that the media holder 450 adapts to different heights due to thicknesses of the media 140.

Figure 5:
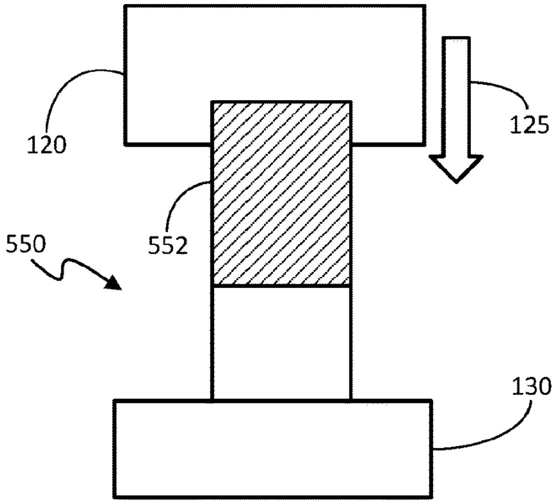
FIG. 5 is a schematic diagram of another example of a media holder.

FIG. 5 is a schematic diagram of a front view of another example of a media holder 550. The media holder 550 may interact with previously disclosed elements from FIG. 1 referred to with the same reference numerals. Parts of the media holder 550 may be similar to the corresponding parts of the media holder 150 of FIG. 1. Accordingly, the media holder 550 comprises a central portion 155, a first end coupled to the platen 130, and a second end coupled to the scan beam 120.

The media holder 550 comprises an elongated body element 552 at the central portion 155 between the first end and the second end. The length of the elongated body 552 spans a distance shorter than the distance between the first end and second end measured when the first end and second end are in a substantially horizontal position, thereby leaving the remaining distance as a gap. In the examples herein, the term 'elongated' may be understood as the geometrical property of being long in relation to its width. As such the elongated body element 552 has contact with the edge of the media 140 to avoid media warpage and the gap enables the media holder 450 to adapt to different scan beam 120 heights due to thicknesses of the media 140.

In an example, the media holder 550 further comprises a holder guiding system (not shown) between the first end and the second end to guide, for example passively, the elongated body element 552 between the first end and the second end.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a “processor” should thus be interpreted to mean “at least one processor”. The processes, method and functional modules are implemented as machine-readable instructions executable by at least one processor, hardware logic circuitry of the at least one processor, or a combination thereof.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

There have been described example implementations with the following sets of features:

Feature set 1: An apparatus comprising:

- a carriage to move laterally in a scanning direction over a platen;
- a scan beam to support the carriage over the platen;
- a mechanism to move the scan beam vertically; and
- a media holder comprising:
  - a central portion to hold a media on the platen,
  - a first end couplable to the platen at a coupling position, and
  - a second end couplable to the scan beam such that the second end moves vertically along with the scan beam.

Feature set 2: An apparatus with feature set 1, wherein the coupling position is out of a print zone.

Feature set 3: An apparatus with any preceding feature set 1 to 2, wherein the media holder is to hold a first edge of the media on the platen, the apparatus further comprising an additional media holder to hold a second edge of the media on the platen, wherein the first and second edges are opposite edges of the media.

Feature set 4: An apparatus with any preceding feature set 1 to 3, further comprising a guiding system at the coupling position, the guiding system to enable the coupling position to move in the scanning direction.

Feature set 5: An apparatus with any preceding feature set 1 to 4, wherein the media holder comprises an elastic material such that the media holder changes its length as the mechanism moves the scan beam vertically.

Feature set 6: An apparatus with any preceding feature set 1 to 5, wherein the media holder comprises a first elastic part and a second non-elastic part such that the elastic part compresses as the mechanism moves the scan beam vertically downwardly.

Feature set 7: An apparatus with any preceding feature set 1 to 6, wherein the media holder further comprises an elongated body element between the first end and the second end, wherein the length of the elongated body element spans a distance shorter than the distance between the first end and the second end when the first and the second end are in a substantially horizontal position.

Feature set 8: An apparatus with any preceding feature set 1 to 7, wherein the media holder further comprises a holder guiding system between the first and the second end to guide the elongated body element between the first and the second end.

Feature set 9: An apparatus with any preceding feature set 1 to 8, wherein the first end and the second end are respectively removably couplable with the coupling position and the scan beam.

Feature set 10: An apparatus with any preceding feature set 1 to 9, further comprising a controller to: (i) receive data corresponding to the media to be used; and (ii) control the mechanism to move the scan beam vertically based on the thickness of the media to be used.

Feature set 11: An apparatus with any preceding feature set 1 to 10, wherein the controller is further to: (i) receive data corresponding to a distance between a printhead from the carriage and the media; and (ii) control the mechanism to move the scan beam vertically based on the thickness of the media and the distance between the printhead and the media.

Feature set 12: An apparatus with any preceding feature set 1 to 11, wherein the platen is a porous platen such that a vacuum source causes vacuum conditions on the platen.

Feature set 13: A media holder comprising:

- a central portion to hold a media on a platen of a printing device;
- a first end releasably couplable to the platen at a coupling position; and
- a second end releasably couplable to a vertically moveable scan beam that supports a carriage over the platen, such that the second end moves vertically along with the scan beam.

Feature set 14: A media holder with feature set 13, wherein the central portion comprises an elastic material such that the central portion compresses as the scan beam moves vertically downwardly.

Feature set 15: A method comprising:

- loading media on a printing apparatus comprising a media holder;
- holding the media to the platen by a central portion of the media holder;
- coupling a first and second ends of the media holder to a platen and scan beam of the apparatus respectively; and
- moving a scan beam vertically based on a thickness of the media, such that the second end moves vertically along with the scan beam, wherein the scan beam supports a printing carriage over the platen.

What it is claimed is:

1. An apparatus comprising:

- a carriage to move laterally in a scanning direction over a platen;
- a scan beam to support the carriage over the platen;
- a mechanism to move the scan beam vertically; and
- a media holder comprising:
  - a central portion to hold a media on the platen,
  - a first end couplable to the platen at a coupling position, and
  - a second end couplable to the scan beam such that the second end moves vertically along with the scan beam,
- wherein the first end and the second end are provided at vertically opposed ends of the media holder, and wherein the media holder comprises an elastic material and the media holder changes its length when the mechanism moves the scan beam vertically.

2. The apparatus of claim 1, wherein the coupling position is out of a print zone.

3. The apparatus of claim 1, wherein the media holder is to hold a first edge of the media on the platen, the apparatus further comprising an additional media holder to hold a second edge of the media on the platen, wherein the first and second edges are opposite edges of the media.

4. The apparatus of claim 1, further comprising a guiding system at the coupling position, the guiding system to enable the coupling position to move in the scanning direction.

5. The apparatus of claim 1, wherein the media holder comprises a first elastic part and a second non-elastic part such that the elastic part changes its length as the mechanism moves the scan beam vertically.

6. The apparatus of claim 1, wherein the first end and the second end are respectively removably couplable with the coupling position and the scan beam.

7. The apparatus of claim 1, further comprising a controller to:

receive data corresponding to the media to be used; and control the mechanism to move the scan beam vertically based on the thickness of the media to be used.

8. The apparatus of claim 7, wherein the controller is further to:

receive data corresponding to a distance between a printhead from the carriage and the media;

control the mechanism to move the scan beam vertically based on the thickness of the media and the distance between the printhead and the media.

9. The apparatus of claim 1, wherein the platen is a porous platen such that a vacuum source causes vacuum conditions on the platen.

10. A media holder comprising:

a central portion to hold a media on a platen of a printing device;

a first end releasably couplable to the platen at a coupling position; and a second end releasably couplable to a vertically moveable scan beam that supports a carriage over the platen, such that the second end moves vertically along with the scan beam, wherein the first end and the second end are provided at vertically opposed ends of the media holder, and wherein the central portion comprises an elastic material and the central portion compresses when the scan beam moves vertically downwardly.

11. A method comprising:

loading media on a printing apparatus comprising a media holder;

holding the media to the platen by a central portion of the media holder;

coupling a first and second ends of the media holder to a platen and scan beam of the apparatus respectively; and moving a scan beam vertically based on a thickness of the media, such that the second end moves vertically along with the scan beam, wherein the scan beam supports a printing carriage over the platen.

* * * * *